United States Patent
Bernheimer et al.

(10) Patent No.: US 7,694,635 B2
(45) Date of Patent: Apr. 13, 2010

(54) MODULAR FURNITURE COMPONENTS AND CONNECTORS

(76) Inventors: Andrew Bernheimer, 535 W. 23rd St., #N8N, New York, NY (US) 10011; Jared Della Valle, 70 Washington St., Brooklyn, NY (US) 11201

( * ) Notice: Subject to any disclaimer, the term of this patent is extended or adjusted under 35 U.S.C. 154(b) by 696 days.

(21) Appl. No.: 11/591,200

(22) Filed: Nov. 1, 2006

(65) Prior Publication Data

US 2008/0098938 A1 May 1, 2008

(51) Int. Cl.
*A47B 13/00* (2006.01)

(52) U.S. Cl. .............. 108/153.1; 108/150; 403/217

(58) Field of Classification Search .......... 108/153.1, 108/150, 157.1, 50.01, 180, 190, 191, 192, 108/193; 248/188, 188.7, 188.1, 188.8; 403/217, 403/219, 202
See application file for complete search history.

(56) References Cited

U.S. PATENT DOCUMENTS

| | | | | |
|---|---|---|---|---|
| 1,731,920 | A | * | 10/1929 | Boettger ............. 108/153.1 |
| D182,964 | S | | 6/1958 | Kjer |
| 3,221,466 | A | * | 12/1965 | Downing, Jr. et al. ..... 403/219 |
| 3,360,287 | A | * | 12/1967 | Wyse ................ 403/217 |
| 3,522,778 | A | * | 8/1970 | Porath et al. ......... 108/153.1 |
| 3,877,669 | A | | 4/1975 | Ambasz |
| 3,921,363 | A | * | 11/1975 | Beynon ............. 403/219 |
| 3,940,100 | A | | 2/1976 | Haug |
| 4,117,784 | A | * | 10/1978 | Piretti ............. 108/150 |
| 4,175,682 | A | * | 11/1979 | Bott ............... 403/217 |
| 4,178,858 | A | | 12/1979 | Ponzellini |
| 4,187,034 | A | * | 2/1980 | Dziewolski .......... 403/217 |
| 4,247,218 | A | * | 1/1981 | Jeannin ............ 403/217 |
| 4,351,621 | A | | 9/1982 | Liou |
| 4,448,378 | A | * | 5/1984 | Binfare ............. 403/217 |
| 4,748,913 | A | | 6/1988 | Favaretto et al. |
| 4,966,341 | A | | 10/1990 | Borsani |
| 5,165,638 | A | | 11/1992 | Fallon et al. |
| D354,411 | S | | 1/1995 | Berkowitz |
| 5,439,269 | A | * | 8/1995 | Cheng ............. 108/150 |

(Continued)

*Primary Examiner*—José V Chen
(74) *Attorney, Agent, or Firm*—Keith D. Nowak, Esq.; Carter Ledyard & Milburn LLP

(57) ABSTRACT

On a first furniture part, a first connector having an extending tab with a bolt hole transversely therethrough and having a bolt receptacle partially therethrough as well as a recess located parallel with the extending tab; and on a second furniture part, a second connector identical to the first connector and having an extending tab with a bolt hole transversely therethrough and having a bolt receptacle partially therethrough as well as a recess located parallel with the extending tab, the spatial orientation of the second connector being rotated 180 degrees with respect to the first connector during connection of the first connector and the second connector such that the extending tab of the first connector is matable with the recess of the second connector with the bolt hole of the extending tab of the first connector in alignment with the bolt receptacle of the extending tab of the second connector to receive a first bolt, and the extending tab of the second connector is matable with the recess of the first connector with the bolt hole of the extending tab of the second connector in alignment with the bolt receptacle of the extending tab of the first connector to receive a second bolt such that the first furniture part and the second furniture part can be connected.

8 Claims, 4 Drawing Sheets

U.S. PATENT DOCUMENTS

| | | |
|---|---|---|
| 5,598,790 A | 2/1997 | Fich |
| D386,331 S | 11/1997 | Grosfillex |
| D386,332 S | 11/1997 | Grosfillex |
| 5,718,179 A | 2/1998 | Johnson et al. |
| 5,848,852 A * | 12/1998 | Shpigel .................... 403/219 |
| 5,867,961 A * | 2/1999 | Castano .................... 403/217 |
| D422,812 S | 4/2000 | Thompson et al. |
| 6,170,410 B1 * | 1/2001 | Gioacchini et al. ....... 108/153.1 |
| 6,182,581 B1 | 2/2001 | Boyce |
| 6,814,010 B2 | 11/2004 | Bart |
| 7,220,218 B1 * | 5/2007 | Chu .......................... 403/217 |
| 2005/0274297 A1 | 12/2005 | Montague, III et al. |
| 2005/0284341 A1 | 12/2005 | Klassy et al. |

\* cited by examiner

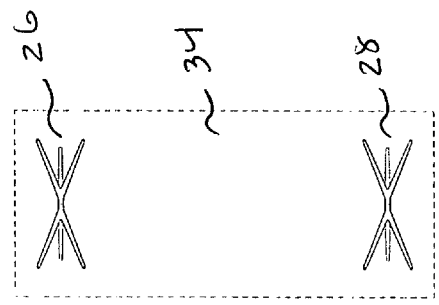
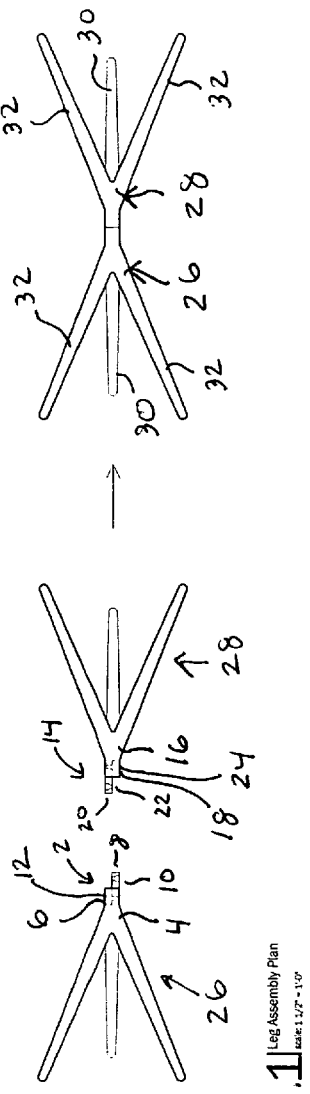
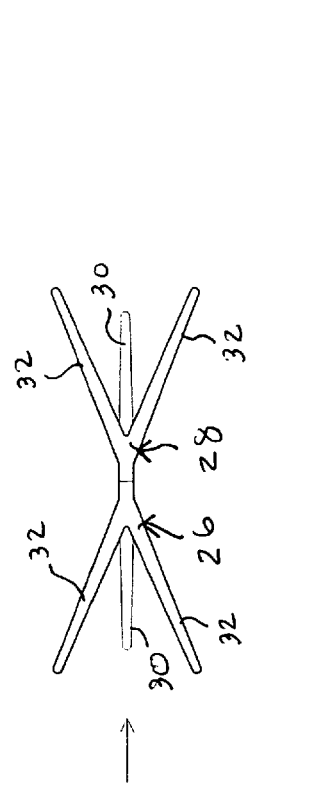
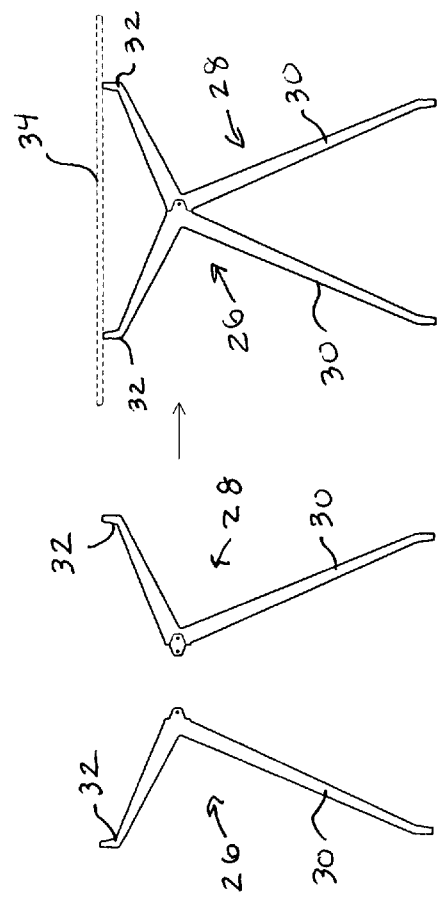

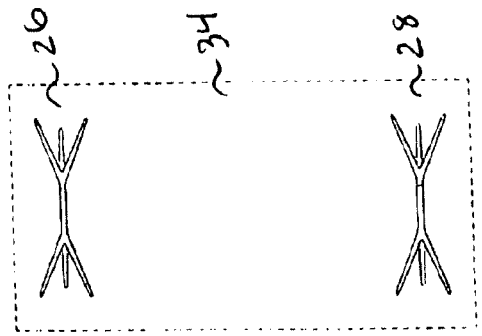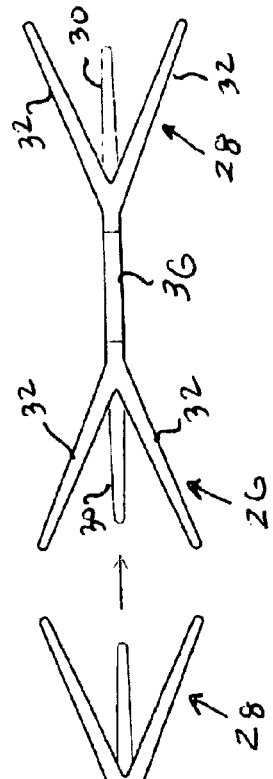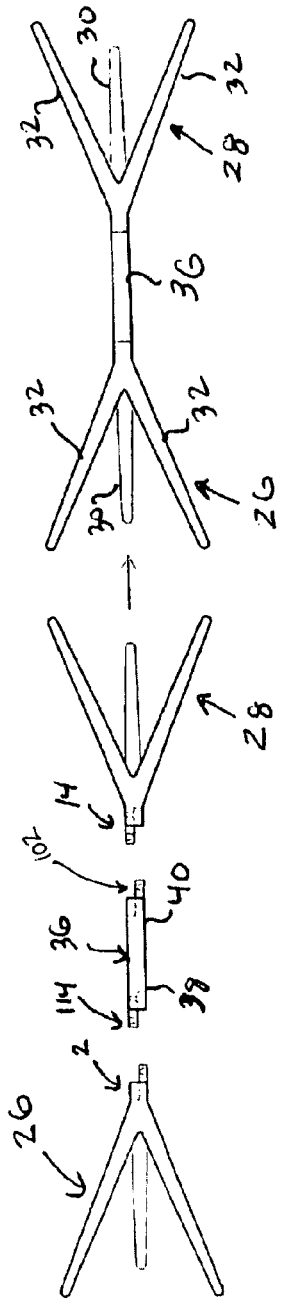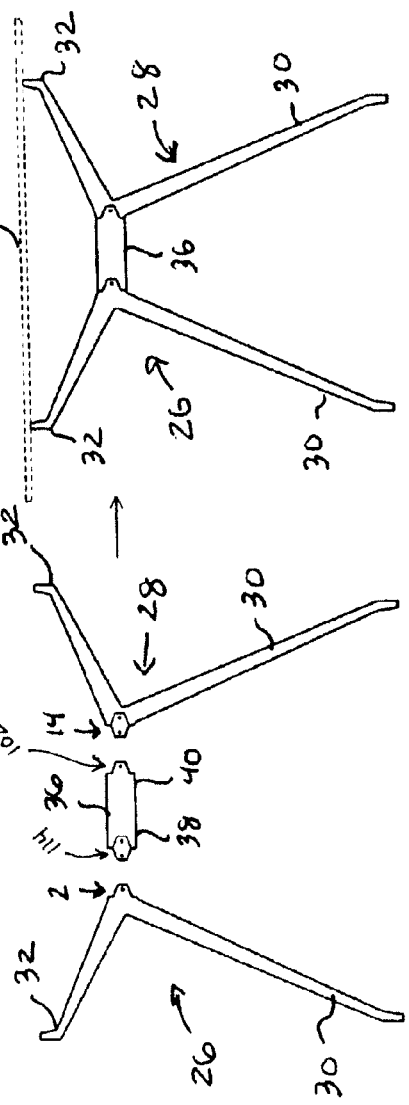

MODULAR FURNITURE COMPONENTS AND CONNECTORS

BACKGROUND OF THE INVENTION

The subject invention pertains to modular furniture components and connectors therefore. More specifically, the subject invention relates to modular table legs and connectors therefore.

U.S. Pat. No. 3,877,669 discloses furniture having a central tubular member around which a changeable number of arms and legs can be attached based upon the width in degrees (i.e. 180 degrees for two, 120 degrees for three, 90 for four) of the flange on the arms or legs that attach in a recess of the central tubular member. A bolt and cap through the center of the central tubular member secures all.

U.S. Pat. Nos. 5,165,638 and 4,178,858 both disclose furniture that employ the arms or legs with flanges of varying angles of the above U.S. Pat. No. 3,877,669, but each of these patents employ only a central bolt and cap to secure the arms or legs, with the flanges of the arms and legs in direct contact, and do not include a central tubular member having a recess around which the flanges connect to the central tubular member.

U.S. Pat. No. 3,940,100 discloses furniture connectors, each of which are flat, have three legs with arc-shaped sides therebetween and a slot at the apex of each leg which is matable with the slot at the apex of the leg of another like furniture connector.

U.S. Pat. No. 4,351,621 discloses a connector for connecting sheet members together to form furniture with a connector body having outwardly extending and facing slots extending about a central axis. Each slot receives a sheet member which is locked in place with a set screw. A plastic liner is preferably provided between the slot walls and member.

U.S. Patent Publication No. 2005/0274297 discloses a table system with a multitude of tabletops and a modular constructed table support. The tabletops are of various sizes and shapes with peripheries that complement each other so that table systems may be grouped together. The table support includes a module of a horizontally disposed base member, a connected, upwardly directed curved leg member, a mounting pad and opposing foot members. A second variation includes two back-to-back base members, corresponding leg members, pads and foot members and a linear bridge structure. A third variation includes four base members, four leg members, four pads, four foot members and a cross shaped bridge structure.

U.S. Pat. No. 6,814,010 discloses knockdown furniture including a table with flat, interlocking, planar parts assembled or disassembled without tools or fasteners. Planar legs oriented in radially, spaced apart, mutually abutting relation upon erection, compressively grasp and support an elevated top. Each leg has a foot touching the ground, an integral, upwardly, outwardly diverging arm for grasping the top, a vertically upright protrusion of gradually decreasing width, and a junction region from which these parts emanate. A planar lock includes slots through which the protrusions pass when the furniture is press-fitted together. Lock notches aligned with the slots concurrently engage the arms. Each protrusion decreases in width, with the outside of each protrusion forming a ramp, and the inside forming an elongated, vertical edge. The wedging action resulting from slot-to-ramp engagement locks the legs together, with the complimentary protrusion edges firmly abutting one another and with the top compressively grasped by the arms.

In summary, none of the prior art discloses the mirror-imaged first and second connectors, each having an extending tab with a bolt through hole and a recess having a bolt receptacle which are in alignment with their counterpart components on the opposite connector such that each mated pair receives a bolt for connection.

SUMMARY OF THE INVENTION

A first connector is located on a first furniture part. The first connector has an extending tab with a bolt hole transversely therethrough and having a bolt receptacle partially therethrough as well as a recess located parallel with the extending tab. A second connector is located on a second furniture part. The second connector is identical to the first connector and has an extending tab with a bolt hole transversely therethrough and has a bolt receptacle partially therethrough as well as a recess located parallel with the extending tab. The spatial orientation of the second connector is rotated 180 degrees with respect to the first connector during connection of the first connector and second connector. The extending tab of the first connector mates with the recess of the second connector with the bolt hole of the extending tab of the first connector in alignment with the bolt receptacle of the extending tab of the second connector to receive a first bolt. The extending tab of the second connector mates with the recess of the first connector, with the bolt hole of the extending tab of the second connector in alignment with the bolt receptacle of the extending tab of the first connector, to receive a second bolt such that the first furniture part and the second furniture part are connected.

Preferably, the first furniture part and the second furniture part form a table base when connected.

In an alternate embodiment, the first furniture part and the second furniture part additionally include a third extension furniture part having a first end and a second end and spacing the first furniture part from, and connecting it to, the second furniture part.

The first end of the third extension furniture part has a third connector having an extending tab with a bolt hole transversely therethrough and has a bolt receptacle partially therethrough as well as a recess located in plane with the extending tab to be matable with the first connector of the first furniture part. The second end of the third extension furniture part has a fourth connector having an extending tab with a bolt hole transversely therethrough and has a bolt receptacle partially therethrough as well as a recess located in plane with the extending tab to be matable with the second connector of the second furniture part to form a table base with an extension bar between the two table base sections.

In another alternate embodiment, the first furniture part and the second furniture part additionally include a third furniture part having a third connector with an extending tab with a bolt hole transversely therethrough and having a bolt receptacle partially therethrough as well as a recess located in plane with the extending tab. Also present is a fourth connection joint having three connectors, each with an extending tab with a bolt hole transversely therethrough and having a bolt receptacle partially therethrough as well as a recess located in plane with the extending tab. One of each of the three connectors of the fourth connection joint is matable with one of the first connector of the first furniture part, second connector of the second furniture part and third connector of the third furniture part to form a table base with three support sections.

BRIEF DESCRIPTION OF THE DRAWINGS

FIG. 2A is a pre-assembly plan view of a first embodiment of the subject invention forming a table base;

FIG. 2B is a post-assembly plan view of a first embodiment of the subject invention forming a table base;

FIG. 2C is a pre-assembly elevation view of a first embodiment of the subject invention forming a table base;

FIG. 2D is a post-assembly elevation view of a first embodiment of the subject invention forming a table base;

FIG. 2E is a post-assembly plan view of a completed table of the first embodiment of the subject invention;

FIG. 3A is a pre-assembly plan view of a second embodiment of the subject invention forming a table base with an extension bar;

FIG. 3B is a post-assembly plan view of a second embodiment of the subject invention forming a table base with an extension bar;

FIG. 3C is a pre-assembly elevation view of a second embodiment of the subject invention forming a table base with an extension bar;

FIG. 3D is a post-assembly elevation view of a second embodiment of the subject invention forming a table base with an extension bar;

FIG. 3E is a post-assembly plan view of a completed table of the second embodiment of the subject invention;

These and other subjects, features and advantages of the present invention will become more apparent in light of the following detailed description of a best mode embodiment thereof, as illustrated in the accompanying Drawings.

DETAILED DESCRIPTION OF THE PREFERRED EMBODIMENTS

Figure 1:
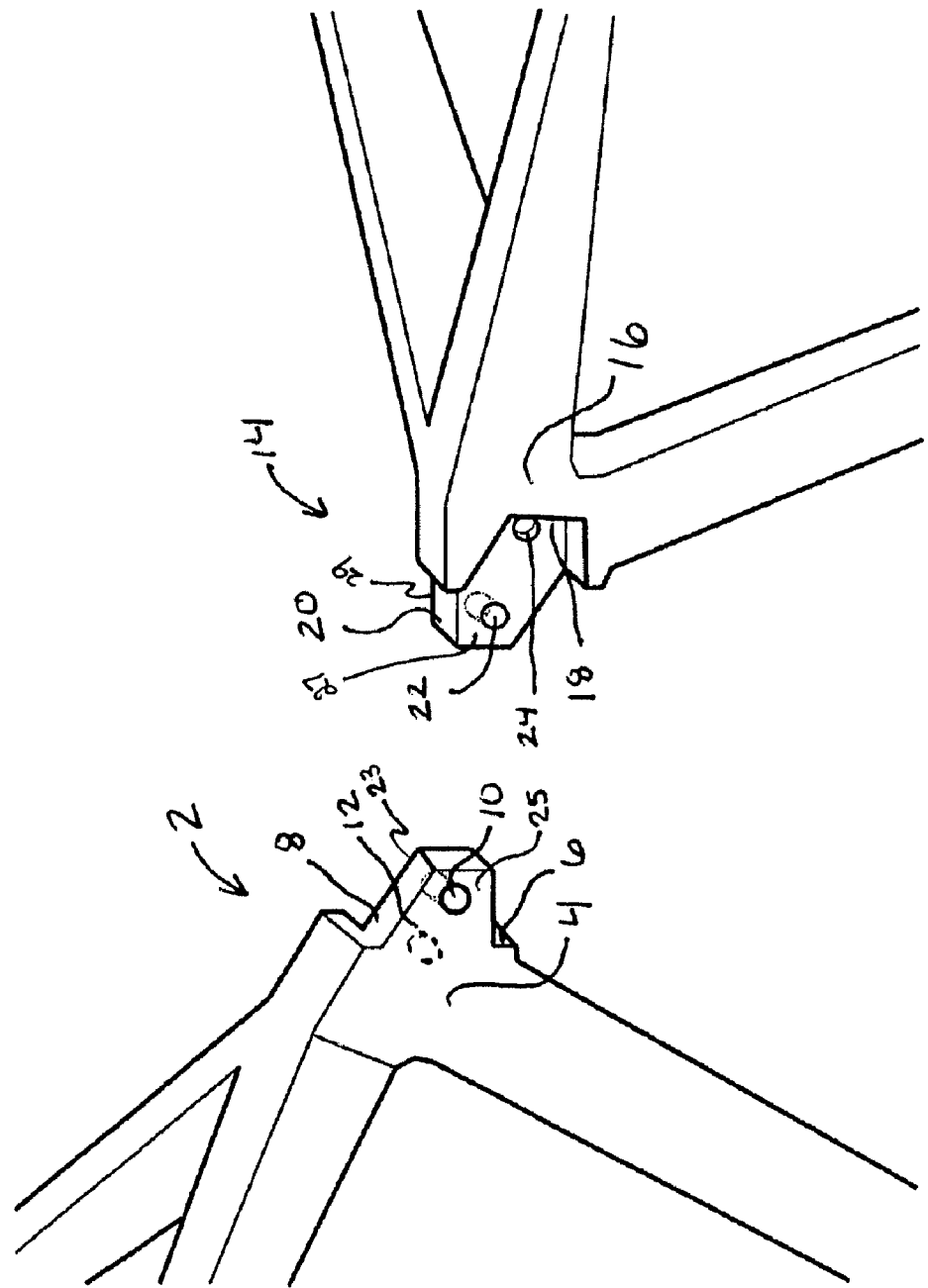
FIG. 1 is a perspective view of the first and second connector components that form the connector of the subject invention.
Figure 4A:
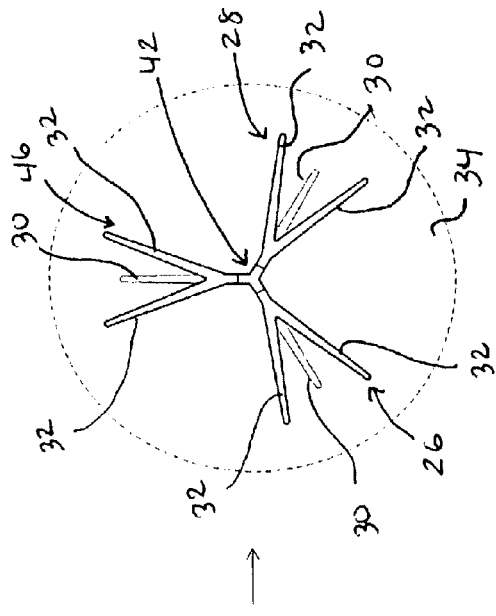
FIG. 4A is a pre-assembly plan view of a third embodiment of the subject invention forming a table base with a multiple connection joint.
Figure 4B:
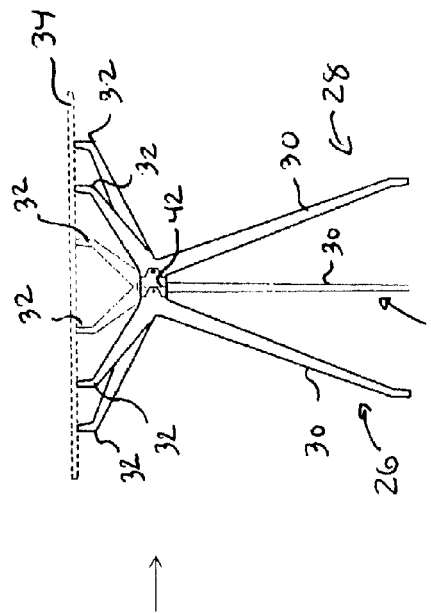
FIG. 4B is a post-assembly plan view of a third embodiment of the subject invention forming a table base with a multiple connection joint.
Figure 4C:
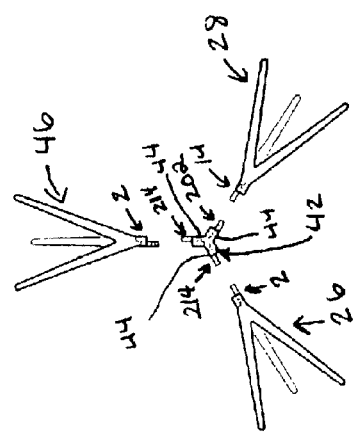
FIG. 4C is a pre-assembly elevation view of a third embodiment of the subject invention forming a table base with a multiple connection joint.
Figure 4D:
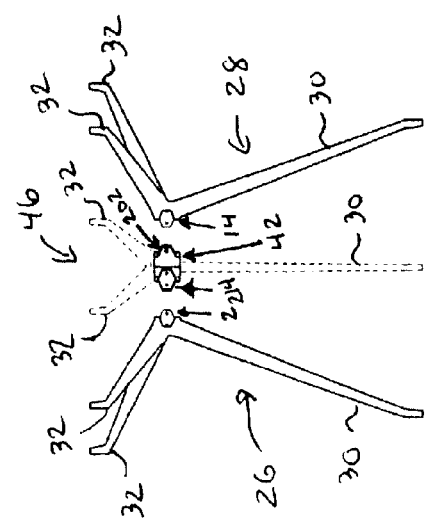
FIG. 4D is a post-assembly elevation view of a third embodiment of the subject invention forming a table base with a multiple connection joint.

Referring to FIG. 1, matable connector components 2 and 14 are shown. Connector components 2 and 14 are fixedly attached to furniture parts, preferably base parts, in order to connect these furniture parts to form modular furniture, such as a table formed from two or more table base parts joined by connector components 2 and 14.

Connector components 2 and 14 each have a base 4 and 16, respectively. Bases 4 and 16 of connector components 2 and 14 each have a recess 6 and 18, respectively, therein. Connector components 2 and 14 also each have an extending tab 8 and 20, respectively, located parallel to recess 6 and 18, respectively. Extending tab 8 and 20 each have an first or inner surface 23, 27, respectively and an second or outer surface 25, 29, respectively, where the first or inner surface 23, 27, of each tab 8 and 20 is adjacent said recess 6 and 18, respectively. Extending tabs 8 and 20 each have a bolt hole 10 and 22, respectively, through tabs 8 and 20. Extending tabs 8 and 20 also each have a bolt receptacle 12 and 24, respectively, at least partially through extending tabs 8 and 20.

The spatial orientation of connector component 2 is rotated 180 degrees with respect to the spatial orientation of connector component 14 during connection of connector component 2 and connector component 14. More specifically, the spatial orientations of recess 6 and recess 18 are opposite in bases 4 and 16, respectively, and the spatial orientations of extending tab 8 and extending tab 20 are opposite on bases 4 and 16, respectively. In this manner, recess 6 of connector component 2 can mate with extending tab 20 of connector component 14 and recess 18 of connector component 14 can mate with extending tab 8 of connector component 2 to form a connector between two furniture parts (preferably table base parts). The above described joining of connector component 2 and connector component 14 results in alignment of bolt hole 10 through extending tab 8 of connector component 2 with bolt receptacle 24 in tab 20 of connector component 14, as well as the alignment of bolt hole 22 through extending tab 20 of connector component 14 with bolt receptacle 12 in tab 8 of connector component 2 such that two bolts can secure the joined connector component 2 and connector component 14.

Specific embodiments of the subject invention are next described which are understood to be non-limiting examples. The furniture parts, which are table base parts in the three below described embodiments, are all joined by one or more connector component 2 and connector component 14, the specific elements of which need not be repeated as they have been detailed above and are incorporated into the below specific embodiments by reference. It is to be noted that in the below specific embodiments, wherever connector component 2 is referenced connector component 14 can be used instead with a complementary change of its matching connector component 14 to connector component 2, and vice versa.

Referring to FIGS. 2A through 2E a first specific embodiment of the subject invention is shown in which table base part 26 is directly connected to table base part 28 using connector component 14 in the manner described in detail above. Each of table base part 26 and table base part 28 have a plurality of legs 30 (one each in this non-limiting example, but more can be employed) and table top supports 32 (two each in this non-limiting example, but more or less can be employed). Table top supports 32 provide support for table top 34. FIGS. 2A through 2D show the interconnection of table base part 26 and table base part 28, and FIGS. 2D and E show the placement of table top 34 on table top supports 32 of the table base part 26 and table base part 28.

Next referring to FIG. 3A through FIG. 3E a second specific embodiment of the subject invention is shown, having all of the components of the embodiment of FIGS. 2A through 2E, above, which are numbered the same and incorporated by reference. The specific embodiment of FIGS. 3A through 3E is substantially similar to that of FIGS. 2A through 2E, but for the addition of extension bar 36, a longitudinal disposed component with one of either connector component 102 or connector component 114 on each of its two ends 38 and 40. When connector component 102 is located on end 38 or end 40 of extension bar 36, connector component 14 is located on table base part 26 or table base part 28 and vice versa. Extension bar 36 functions to space table base part 26 from table base part 28 to support wider table tops 34.

Next referring to FIG. 4A through FIG. 4D. a third specific embodiment of the subject invention is shown, having all of the components of the embodiment of FIG. 2A through FIG. 2E, above, which are numbered the same and incorporated by reference. The specific embodiment of FIG. 4A through FIG. 4D is substantially similar to that of FIG. 2A through FIG. 2E but for the addition of multiple connection joint 42, a truncated, multi-faced component with one of either connector component 202 or connector component 214 on each of its faces 44 (of which there are at least three, but more are within the scope of the subject invention). When a connector component 202 is located on a specific face 44 of multiple connection joint 42, connector component 14 is located on table base part 26, table base part 28 or additionally shown table base part 46, and vice versa. Additionally shown table base part 46 provides a tri-part base configuration that, in addition to multiple connection joint 42, support round table tops 34.

Although the invention has been shown and described with respect to a best mode embodiment thereof, it should be understood by those skilled in the art that various changes, omissions, and additions may be made to the form and detail of the disclosed embodiment without departing from the spirit and scope of the invention, as recited in the following claims.

We claim:

1. On a first furniture part, a first connector having an extending tab with a bolt hole transversely therethrough and having a bolt receptacle at least partially therethrough as well as a recess located parallel with the extending tab, wherein said extending tab of said first connector has a first surface and a second surface, wherein said recess of said first connector is disposed adjacent to said first surface of said extending tab of said first connector; and on a second furniture part, a second connector having an extending tab with a bolt hole transversely therethrough and having a bolt receptacle at least partially therethrough as well as a recess located parallel with the extending tab, wherein said extending tab of said second connector has a first surface and a second surface, wherein said recess of said second connector is disposed adjacent to said first surface of said extending tab of said second connector, wherein the second connector has a spatial orientation with respect to the first connector during connection of the first connector and the second connector such that the extending tab of the first connector is releasably matable with the recess of the second connector with the bolt hole of the extending tab of the first connector in alignment with the bolt receptacle of the extending tab of the second connector to receive a first bolt, and the extending tab of the second connector is releasably matable with the recess of the first connector with the bolt hole of the extending tab of the second connector in alignment with the bolt receptacle of the extending tab of the first connector to receive a second bolt such that the first furniture part and the second furniture part can be connected, wherein said spatial orientation of the second connector being a rotation of 180 degrees with respect to the first connector, and wherein when the first connector and the second connector are connected the first surface of the extending tab of the first connector is adjacent the first surface of the extending tab of the second connector.

2. The first furniture part and the second furniture part of claim 1 wherein the first furniture part and the second furniture part form a table base when connected.

3. The first furniture part and the second furniture part of claim 1 further comprising:

a third extension furniture part having a first end and a second end and spacing the first furniture part from, and connecting to, the second furniture part;

the first end of the third extension furniture part having a third connector having an extending tab with a bolt hole transversely therethrough and having a bolt receptacle at least partially therethrough as well as a recess located parallel with the extending tab to be releasably matable with the first connector of the first furniture part, wherein said extending tab of said third connector has a first surface and a second surface, wherein said recess of said third connector is disposed adjacent to said first surface of said extending tab of said third connector wherein when the third connector and the first connector are releasably matable the first surface of the extending tab of the third connector is adjacent the first surface of the extending tab of the first connector; and the second end of the third extension furniture part having a fourth connector having an extending tab with a bolt hole transversely therethrough and having a bolt receptacle at least partially therethrough as well as a recess located parallel with the extending tab to be releasably matable with the second connector of the second furniture part, wherein said extending tab of said fourth connector has a first surface and a second surface, wherein said recess of said fourth connector is disposed adjacent to said first surface of said extending tab of said fourth connector, wherein when the fourth connector and the second connector are releasably matable the first surface of the extending tab of the fourth connector is adjacent the first surface of the extending tab of the second connector.

4. The first furniture part and the second furniture part of claim 1 further comprising:

a third furniture part having a third connector with an extending tab with a bolt hole transversely therethrough and having a bolt receptacle at least partially therethrough as well as a recess located parallel with the extending tab, wherein said extending tab of said third connector has a first surface and a second surface, wherein said recess of said third connector is disposed adjacent to said first surface of said extending tab of said third connector; and a fourth connection joint having three connectors each with an extending tab with a bolt hole transversely therethrough and having a bolt receptacle at least partially therethrough as well as a recess located parallel with the extending tab such that one of each of the three connectors of the fourth connection joint is releasably matable with one of the first connector of the first furniture part, the second connector of the second furniture part and the third connector of the third furniture part, wherein each said extending tab of said fourth connection joint has a first surface and a second surface, wherein said recess of said fourth connection joint is disposed adjacent to said first surface of said extending tab of said fourth connection joint, and wherein when each of the three connectors of the fourth connection joint is releasably matable with one of the first connector, the second connector and the third connector, each the first surface of the extending tab of the fourth connection joint is adjacent the first surface of the extending tab of each the first connector, the second connector and the third connector.

5. A furniture connection component comprising:

a first connector having an extending tab with a bolt hole transversely therethrough and having a bolt receptacle at least partially therethrough as well as a recess located parallel with the extending tab, wherein said extending tab of said first connector has a first surface and a second surface, wherein said recess of said first connector is disposed adjacent to said first surface of said extending tab of said first connector; and a second connector having an extending tab with a bolt hole transversely therethrough and having a bolt receptacle at least partially therethrough as well as a recess located parallel with the extending tab, wherein said extending tab of said second connector has a first surface and a second surface, wherein said recess of said second connector is disposed adjacent to said first surface of said extending tab of said second connector, wherein the second connector has a spatial orientation with respect to the first connector during connection of the first connector and the second connector such that the extending tab of the first connector releasably mates with the recess of the second connector with the bolt hole of the extending tab of the first connector in alignment with the bolt receptacle of the extending tab of the second connector to receive a first bolt, and the extending tab of the second connector releasably mates with the recess of the first connector with the bolt hole of the extending tab of the second connector in alignment with the bolt receptacle of the first connector to receive a second bolt, wherein said spatial orientation of the second connector being a rotation of 180 degrees with respect to the first connector, and wherein when the first connector and the second connector are connected the first surface of the extending tab of the first connector is adjacent the first surface of the extending tab of the second connector.

6. The first connector and the second connector of claim 5 wherein the first connector and the second connector are attachable to a first furniture part and to a second furniture part respectively to form a table base.

7. The first furniture part and the second furniture part of claim 6 further comprising:

a third extension furniture part having a first end and a second end and spacing the first furniture part from, and connecting to, the second furniture part;

the first end of the third extension furniture part having a third connector having an extending tab with a bolt hole transversely therethrough and having a bolt receptacle at least partially therethrough as well as a recess located parallel with the extending tab to be releasably matable with the first connector of the first furniture part, wherein said extending tab of said third connector has a first surface and a second surface, wherein said recess of said third connector is disposed adjacent to said first surface of said extending tab of said third connector, wherein when the third connector and the first connector are releasably matable the first surface of the extending tab of the third connector is adjacent the first surface of the extending tab of the first connector; and the second end of the third extension furniture part having a fourth connector having an extending tab with a bolt hole transversely therethrough and having a bolt receptacle at least partially therethrough as well as a recess located parallel with the extending tab to be releasably matable with the second connector of the second furniture part, wherein said extending tab of said fourth connector has a first surface and a second surface, wherein said recess of said fourth connector is disposed adjacent to said first surface of said extending tab of said fourth connector, wherein when the fourth connector and the second connector are releasably matable the first surface of the extending tab of the fourth connector is adjacent the first surface of the extending tab of the second connector.

8. The first furniture part and the second furniture part of claim 6 further comprising:

a third furniture part having a third connector with an extending tab with a bolt hole transversely therethrough and having a bolt receptacle at least partially therethrough as well as a recess located parallel with the extending tab, wherein said extending tab of said third connector has a first surface and a second surface, wherein said recess of said third connector is disposed adjacent to said first surface of said extending tab of said third connector; and a fourth connection joint having three connectors each with an extending tab with a bolt hole transversely therethrough and having a bolt receptacle at least partially therethrough as well as a recess located parallel with the extending tab such that one of each of the three connectors of the fourth connection joint is releasably matable with one of the first connector of the first furniture part, the second connector of the second furniture part and the third connector of the third furniture part, wherein each said extending tab of said fourth connection joint has a first surface and a second surface, wherein said recess of said fourth connection joint is disposed adjacent to said first surface of said extending tab of said fourth connection joint, wherein when each of the three connectors of the fourth connection joint is releasably matable with one of the first connector, the second connector and the third connector, each the first surface of the extending tab of the fourth connection joint is adjacent the first surface of the extending tab of each the first connector, the second connector and the third connector.

* * * * *